United States Patent [19]

Kronfeld

[11] Patent Number: 4,574,441
[45] Date of Patent: Mar. 11, 1986

[54] MULTIPLE STOP POSITION CONTROL APPARATUS FOR A MILLING MACHINE

[76] Inventor: Israel Kronfeld, 941 NE. 170th St., #210, N. Miami Beach, Fla. 33162

[21] Appl. No.: 591,111

[22] Filed: Mar. 19, 1984

[51] Int. Cl.$^4$ .............................................. B23B 49/00
[52] U.S. Cl. ........................................ 29/57; 409/210
[58] Field of Search .............. 29/57; 408/16; 409/210, 409/214

[56] References Cited

U.S. PATENT DOCUMENTS

| | | | |
|---|---|---|---|
| 2,342,829 | 2/1944 | Armitage | 409/210 X |
| 2,387,820 | 10/1945 | Armitage et al. | 408/16 |
| 3,724,964 | 4/1973 | Needham | 408/16 X |
| 4,436,462 | 3/1984 | Martinez | 408/16 X |

*Primary Examiner*—Eugene F. Desmond
*Attorney, Agent, or Firm*—Melvin K. Silverman

[57] ABSTRACT

An insertable multiple stop indicator gauge for selective height, depth and workpiece platform control as between the tool and the workpiece is disclosed. The multiple stop apparatus is detachably attachable to a milling machine tool carriage and to a screw shaft operably secured to the travel of the carriage, the carriage including upper and lower casting lips, the screw shaft including an adjustable knob threaded on and about the shaft and further including a carriage stop threaded on and about the shaft, but above the adjustable knob. The present inventive improvement comprises an insertable lower stop platform for controlling depth of tool cut in the platform in which the stop platform possesses one fork-like end detachably attachable to the lower casting lip and securable thereonto by the adjustable knob, the lower support platform having a circular opening in its opposite end. There is also provided a rotatable stop collar held within the circular opening in the stop platform and a plurality of stops adjustably held within the collar, the stops parallel to the direction of carriage travel. Additionally provided is an insertable indicator platform having one fork-like end detachably attachable to the carriage stop knob, the indicator platform including receiving means at its opposite end. Additionally, the apparatus includes a plunger-type linear motion indicator fixed within the receiving means of the indicator platform, having the plunger thereof in linear alignment with a selected stop of the rotatable stop collar, such stop reflecting the desired depth of the milling tool in the workpiece, whereby travel of the indicator platform relative to the selected stop of the stop platform may be verified by viewing the face of the indicator during its downward travel with the indicator platform.

6 Claims, 7 Drawing Figures

MULTIPLE STOP POSITION CONTROL APPARATUS FOR A MILLING MACHINE

BACKGROUND OF THE INVENTION

The present invention relates to automatic depth, position control and stop means for milling machines. More particularly, it relates to precision, multiple stops that are detachable to milling machines and that may be quickly selected and adjusted in order to regulate depth of cut, or other control in a workpiece.

Although there are a number of devices in the prior art that are applicable to power tools, such as drill presses, for regulating the depth of cut produced by the cutting tool, no such device is known that is suitable for selective attachment to a milling machine for use only when and where needed, as an accessory to the milling machine.

An example of the prior art in this field, U.S. Pat. No. 3,374,964 to Needham, entitled Multiple Stop for Power Tools, discloses a permanent attachment to a drill press and is not suitable for use with a milling machine. Also, it is not a detachable attachment but, rather, comprises a permanent part of the power tool; therefore, its use is not elective as is the case with the present device. Further, Needham does not have a capability for control of both upward and downward movement; additionally, it is not suitable for also controlling height and lateral position of a power worktable of the type commonly used in connection with milling machines.

Also, a further problem in the prior art has involved the need to remove the quill screw shaft to place multi-stop control devices thereonto.

The present invention is believed to be properly classified in the United States Class 408, Subclasses 14 and 72.

SUMMARY OF THE INVENTION

The present invention relates to a multiple stop indicator gage designed for use on a vertical mill providing accurate multi-position control of table (x axis), saddle (y axis) and spindle quill (z axis) not found upon any other device used for that purpose. The device requires only a minimum amount of time and/or skill for attachment, and accommodates virtually any stem type dial indicator.

An object of the invention is to provide a means for precision control of depth of cut that is easily attachable to, incorporated into, and, as desired, removable from power milling tools while offering a rapid selection of any one of a variety of depth stops.

A further object of the present invention is to provide precision control of height of travel of the tool carriage and lateral control of the workpiece platform.

A yet further object is to provide a multiple stop position gauge of the above type that is simple and reliable in construction and that effects reliable stops, not involving any carriage motion in any direction other than that which the carriage normally moves.

Other objects and advantages of the present invention will become apparent from the following Detailed Description viewed with reference to the Drawings and the appended claims.

DETAILED DESCRIPTION OF THE INVENTION

Figure 1:
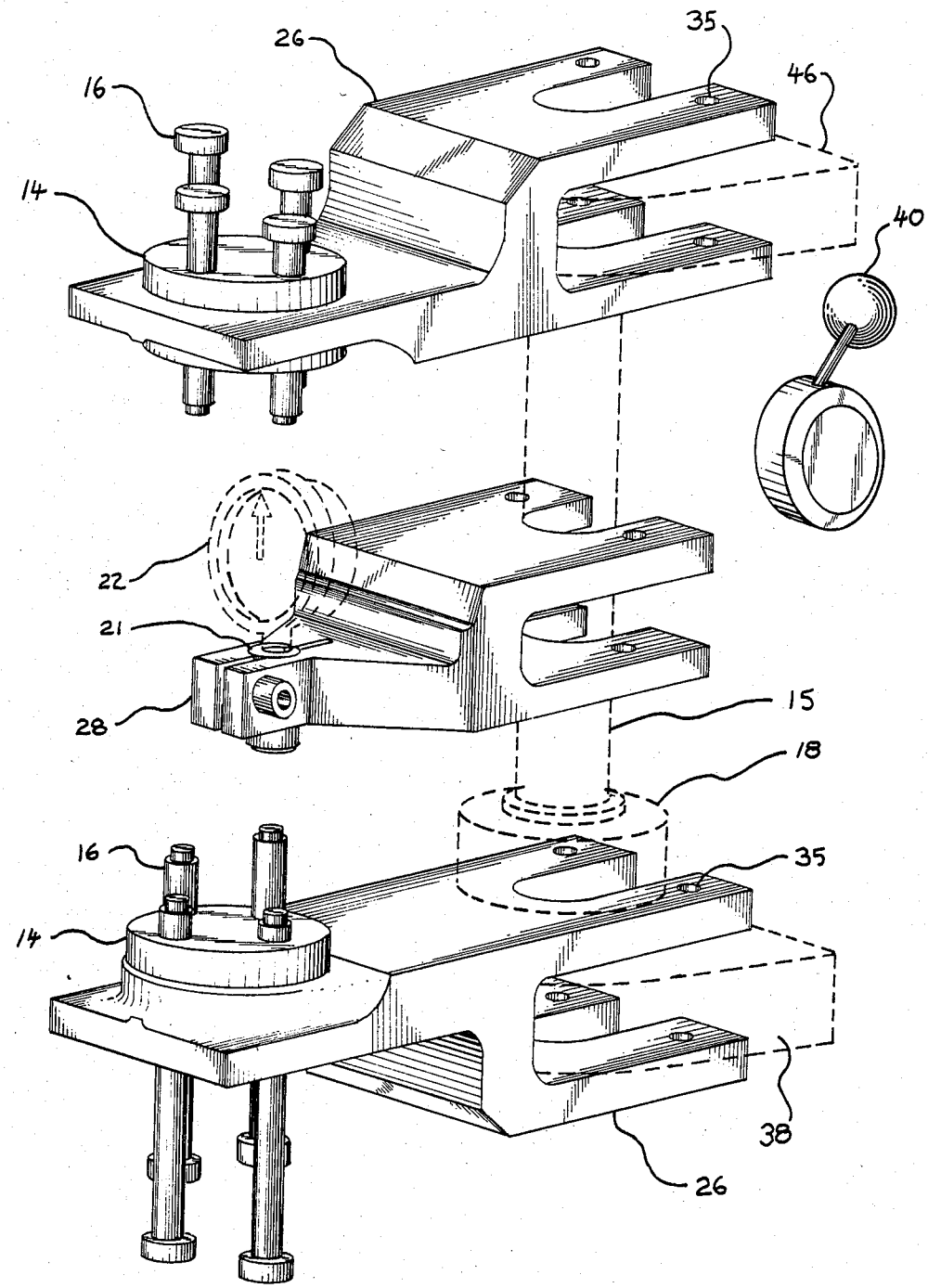
FIG. 1 is a perspective view of the present invention showing upper and lower vertical control stops.
Figure 3:
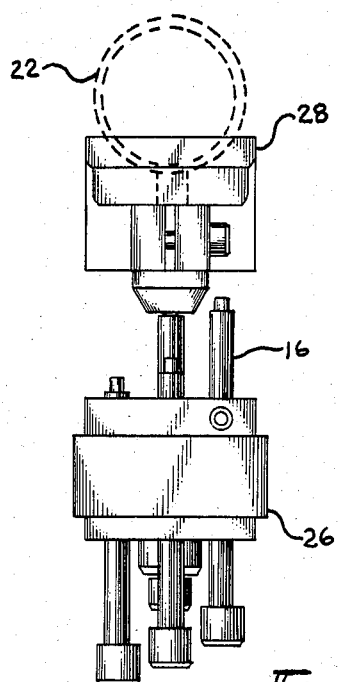
FIG. 3 is a front plan view of FIG. 2.
Figure 6:
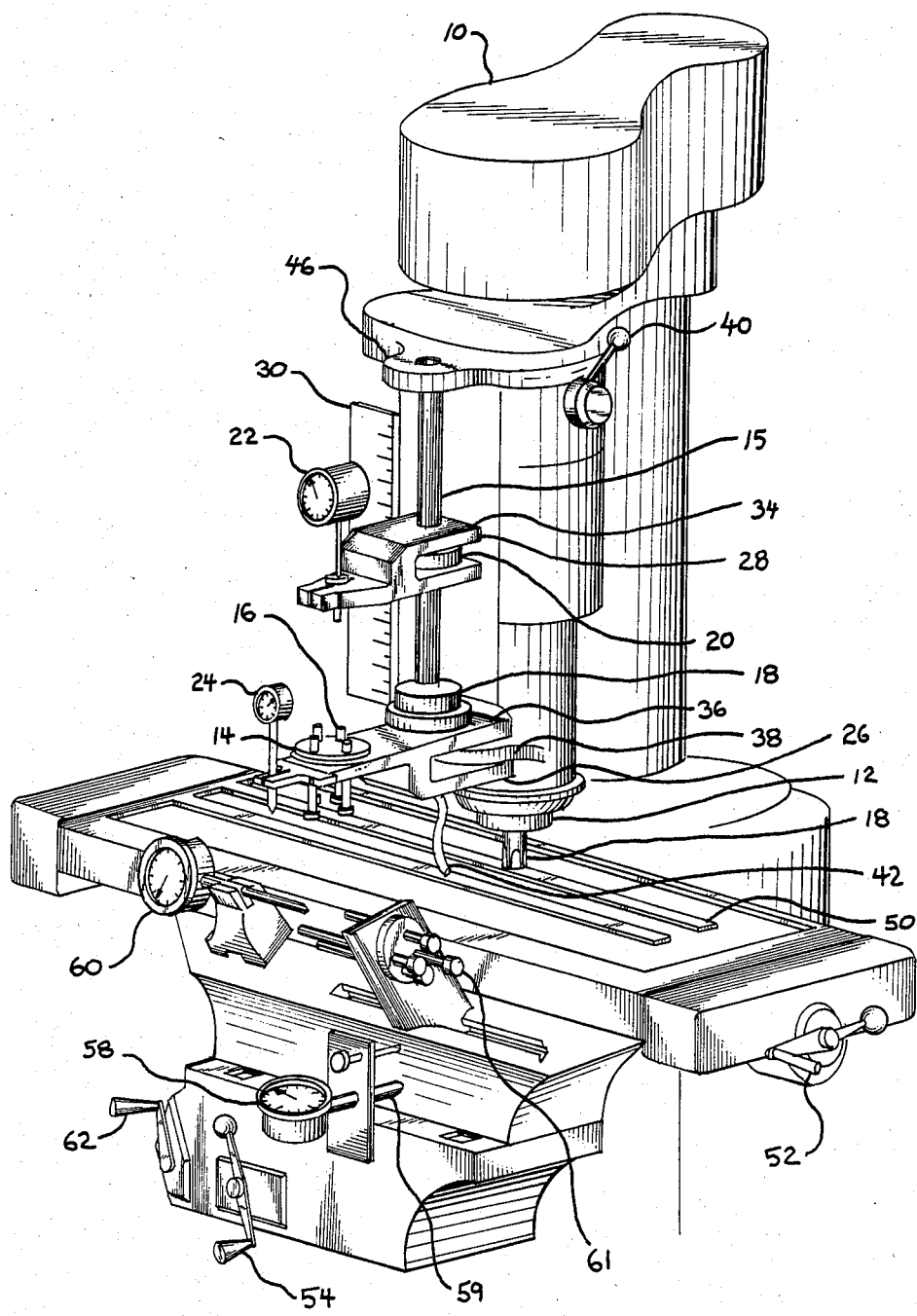
FIG. 6 is a perspective view showing workpiece platform height and traverse position control means.

With reference to FIGS. 1 and 6, there is shown a milling machine 10 having a quill 12 which secures spindle 11 which secures a milling tool 13.

Secured in parallel with the direction of travel of the carriage of the milling machine (and therefore the direction of travel of the quill 12 and tool 13) is a nutscrew shaft 12, the position of which is maintained through the interaction of a lower casting lip 38 and an upper casting lip 46. The nutscrew shaft 12 is normally provided with an adjustable nut 18 disposed on and about the screw shaft 15 and a carriage stop knob 20 (see FIG. 6) which is also secured on and about the screw shaft 15.

Other prior art components of the milling machine system shown in FIGS. 1 and/or 6 include a quill control 40, a workpiece platform 50, a workpiece platform linear longitudinal control 52, a workpiece platform transverse control 54, a vertical carriage movement scale 30, and a shield 44.

Figure 4:
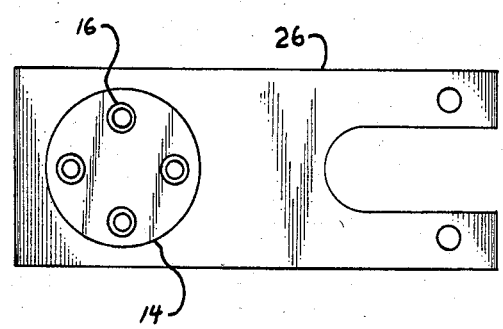
FIG. 4 is a horizontal cross-sectional view of the lower stop platform taken along Line 4—4 of FIG. 2.

The present inventive improvement to prior art milling machines comprises an insertable lower stop platform 26 (see FIGS. 1 and 2) which, as hereinbelow described, controls the depth of cut of tool 13 into a workpiece (not shown). Said lower stop platform 26 is provided with a fork-like configuration at one end (see FIGS. 2 and 4) which configuration is detachably attachable to said lower casting lip 38 through the coaction with said adjustable nut 18, as shown in FIGS. 1 and 6. More particularly, the fork-line end of the lower stop platform 26 is, through the use of Allenhead screws 35, secured to lower casting lip 38. Thereafter, adjustable nut 18 is turned downward into flush and firm contact with stop platform 26, thereby providing further securement of the stop platform 26 to the lip 38 in a desired orientation which, typically, is that of horizontal to the workpiece platform 20.

At the opposite end of the stop platform 26 (see FIG. 4) there is provided a circular opening into which a rotatable stop collar 14 is held. Said stop collar 14 is provided with a plurality of elongate cylindrical stops 16 (see FIGS. 1 and 2) which are oriented parallel to the direction of carriage travel. As with the prior art depth stops, the stop collar 14 may be rotated in order to bring into play that stop 16 having the desired depth.

Above the lower stop platform 26 is provided an insertable indicator platform 28 (see FIGS. 1 and 2) which, as with the stop platform 26, has, at one end thereof, a generally fork-like configuration which is detachably attachable to the screw shaft 12 through the use of the carriage stop knob 20 (see FIG. 6) onto which the prongs of the indicator platform 28 are secured both above and below.

Figure 2:
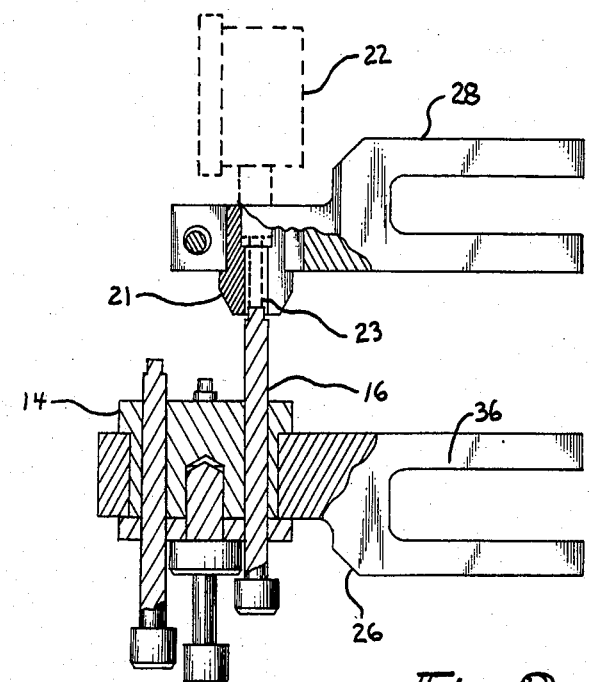
FIG. 2 is a vertical cross-section showing the indicator platform and lower stop platform, with the indicator shown in phantom.
Figure 5:
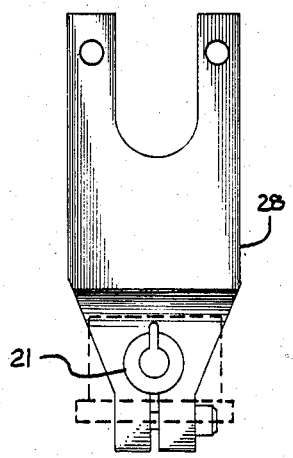
FIG. 5 is a top plan view of the indicator support platform.

The opposite end of the indicator platform 28 is provided with indicator receiving means 21 which are adapted for the receipt of a plunger type linear motion indicator 22 which is held within said receiving means 21 of the indicator platform 28. The indicator 22 is provided with a needle contact 23 which, as shown in FIG. 2, touches the stop 16 within the rotatable stop collar 14 which reflects the desired depth of travel of the milling tool within the workpiece. By virtue of the above inventive arrangement of stop indicator platforms, the travel of the indicator platform 28 relative to the selected stop 16 of the stop platform 26 may be carefully measured and controlled by viewing of the face of the indicator 22 during its downward travel toward the stop collar and platform 26.

Figure 7:
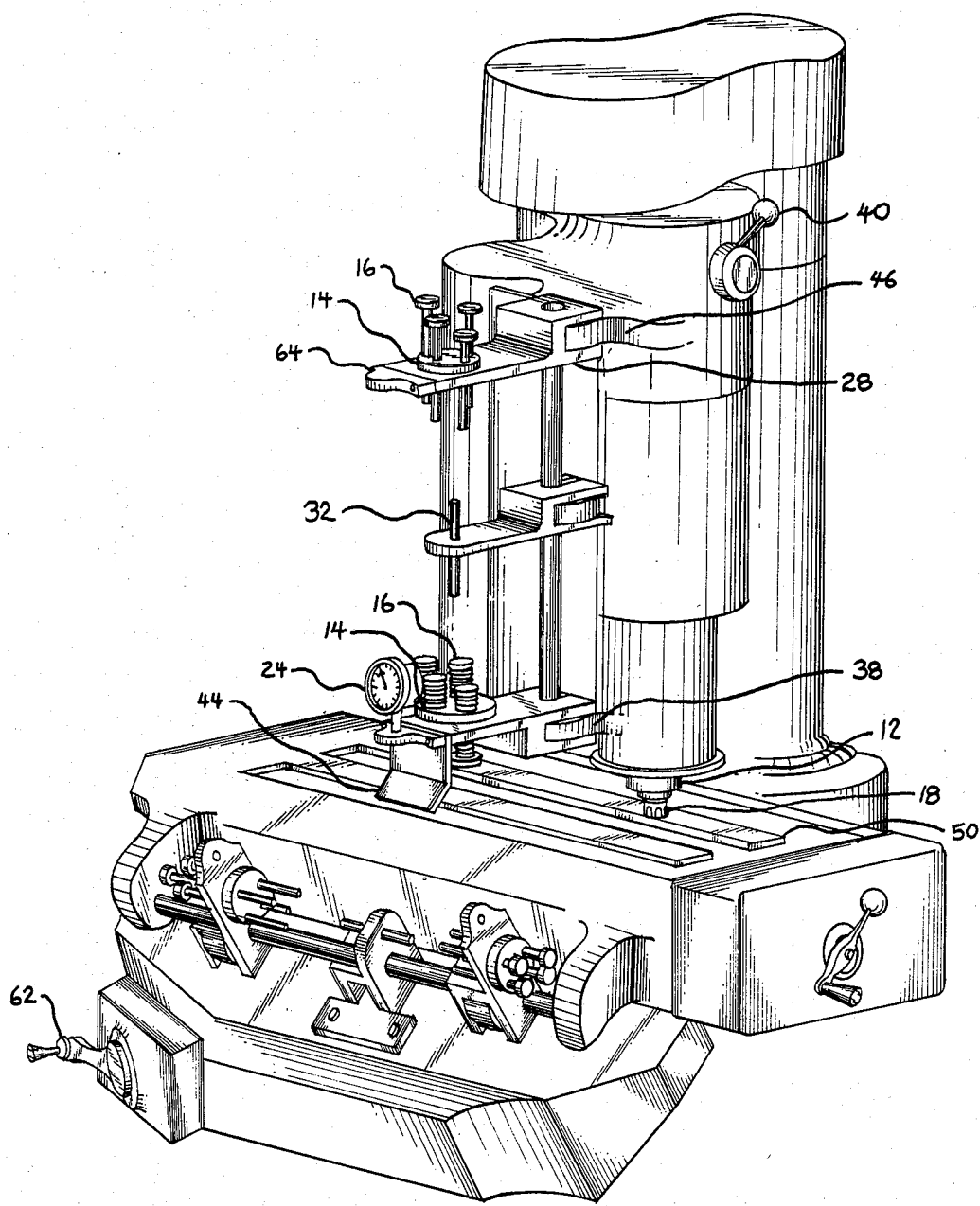
FIG. 7 is a perspective view showing a tool carriage upper stop platform and a stop bar substituted for a dial indicator.

A second embodiment of the present invention is shown in FIG. 7 in which an upper stop platform 28 is provided and, as shown in said Figure, is securable to upper casting lip 46. In this embodiment, a motion limit bar 32 (see FIG. 7) replaces the indicator 22 in order to limit the degree of upward travel of the carriage which is possible. In this mode, stops 16 touch said motion limit bar 32 according to the extent of upward travel is desired.

A third embodiment is shown in FIG. 6 in which the indicator and stop collar arrangement is used with reference to a longitudinally and transversely movable workpiece platform 50. In this embodiment the combination of a stop collar 59 and a plunger type indicator 58 is used in order to carefully measure and control the transverse movement of the workpiece platform 50.

In FIG. 6, a platform-type indicator 24 is used to directly measure the height of the workpiece platform 50. In this embodiment the indicator 24 is placed just beyond the shield 44, so that the indicator 24 might be safely viewed by a worker.

As another embodiment, there is provided an insertable workpiece platform side stop platform 61 detachably attachable to and along a longitudinal side of the workpiece platform, said side stop platform having a rotatable stop collar therein, said stop collar including a plurality of stops adjustably held within said collar, said stops parallel to the direction of possible longitudinal adjustment of the workpiece platform; and a plunger-type linear position indicator 60 detachably secured to a nonmovable base of the milling machine, having a plunger in linerar alignment with a selected one stop of said plurality of stops in said side stop platform 61, whereby the extent of longitudinal travel of the workpiece platform relative to said indicator 60 may be controlled and verified by viewing the face of said indicator during its longitudinally horizontal travel relative to said side stop platform.

Through the above embodiments of the invention it has been found that various parameters affecting the depth and character of the milling of the workpiece can be conveniently measured and controlled by simple rotation of the stop collar in or along the axis of or of whichever parameter one wishes to change or adjust.

Accordingly, while there have been shown and described the preferred embodiments of the present invention, it will be understood that the invention may be embodied otherwise than is herein specifically illustrated or described and that within said embodiments certain changes in the detail and construction, and the form and arrangement of the parts may be made without departing from the underlying idea or principle of this invention within the scope of the appended claims.

Having thus described my invention, what I claim as new, useful and non-obvious and, accordingly, secure by Letters Patent of the United States is:

1. An improvement in a multiple-stop position control apparatus for selective height, depth, and workpiece platform control of tool-to-workpiece position, said apparatus detachably attachable to a milling machine tool carriage and to a screw shaft operably secured parallel to the position of travel of said carriage, said carriage including upper and lower casting lips, said screw shaft including an adjustable nut threaded thereon, said shaft further including a carriage stop knob threaded on and aout said shaft and above said adjustable nut, wherein the inventive improvement comprises:

(a) an insertable lower stop platform for controlling depth of tool cut in a workpiece, said insertable lower stop platform having one fork-like end detachably attachable to said lower casting lip and securable thereonto by said adjustable nut, and said stop platform having a circular opening within its opposite end;

(b) a rotatable stop collar held within said circular opening of said stop platform and a plurality of stops adjustably held within said collar, said stops parallel to the direction of carriage travel;

(c) an insertable indicator platform having one fork-like end detachably attachable to said carriage stop knob, said indicator platform including indicator receiving means at its opposite end; and (d) a plunger-type linear position indicator attachable within sad receiving means of said indicator platform, having the plunger thereof in linear alignment with a selected one stop of said plurality of stops in said rotatable stop collar, said selected stop reflecting the desired depth of travel of the milling tool within the workpiece, whereby the extent of travel of said indicator platform relative to said stop platform may be verified by viewing the face of said indicator during its downward travel with said indicator platform.

2. The position control apparatus as recited in claim 1, further comprising:

an insertable upper stop platform for controlling the extent of upward travel of said tool carriage, said upper stop platform having one fork-like end detachably attachable to said upper casting lip, said upper platform having a rotatable stop collar within its upper end, said stop collar including a plurality of stops adjustably held in said collar, said stop parallel to the direction of carriage travel.

3. The position control apparatus as recited in claim 2 further comprising:

vertical offset means secured to said indicator platform, said offset means comprising means for stable mechanical contact of said offset means and a selected one of said plurality of stops of said upper platform.

4. The position control apparatus as recited in claim 1, further comprising:

a plunger-type linear position indicator, held integrally from said lower stop platform from the stop collar end thereof, in which the plunger thereof is parallel to the direction of carriage travel and is disposed distally from the workpiece platform, whereby the distance between the plane of said lower platform and said workpiece platform can be conveniently measured and, if necessary, adjusted by a workpiece platform height controller of the milling machine.

5. The position control apparatus as recited in claim 4, further comprising:
a plunger-type linear position indicator secured distally from a longitudinal side of said workpiece platform,
whereby the transverse position of the workpiece platform relative to the milling tool can be conveniently measured and, if necessary, adjusted by a workpiece platform transverse position control of the milling machine.

6. The position control apparatus as recited in claim 4, futher comprising:
an insertable workpiece platform side stop platform detachably attachable to and along a longitudinal side of the workpiece platform, said side stop platform having a rotatable stop collar therein, said stop collar including a plurality of stops adjustably held with said collar, said stops parallel to the direction of possible longitudinal adjustment of the workpiece platform; and
a plunger-type linear position indicator detachably secured to a non-movable base of the milling machine, having a plunger in linear alignment with a selected one stop of said plurality of stops in said side stop platform,
whereby the extent of longitudinal travel of the workpiece platform relative to said indicator may be controlled and verified by viewing the face of said indicator during its longitudinally horizontal travel relative to said side stop platform.

* * * * *